Jan. 5, 1965    W. A. HASBANY    3,164,171
DIRECTIONAL CONTROL VALVE
Filed Jan. 30, 1961    4 Sheets-Sheet 1

INVENTOR.
WOODROW A. HASBANY
BY *J. C. Wiessler*
ATTORNEY

Jan. 5, 1965 W. A. HASBANY 3,164,171
DIRECTIONAL CONTROL VALVE
Filed Jan. 30, 1961 4 Sheets-Sheet 2

INVENTOR.
WOODROW A. HASBANY
BY
J. C. Wiessler
ATTORNEY

INVENTOR.
WOODROW A. HASBANY
BY
ATTORNEY

INVENTOR.
WOODROW A. HASBANY
BY J.C. Wiessler
ATTORNEY

United States Patent Office 3,164,171
Patented Jan. 5, 1965

3,164,171
DIRECTIONAL CONTROL VALVE
Woodrow A. Hasbany, South Bend, Ind., assignor to Clark Equipment Company, a corporation of Michigan
Filed Jan. 30, 1961, Ser. No. 85,612
17 Claims. (Cl. 137—596.12)

The present invention relates to directional control valves, and more particularly to valves of this type having no load drop characteristics.

In the operation and control of hydraulic cylinders either of the single or double acting units, using conventional directional control valves, the piston within the cylinder frequently will yield under the weight of the load on the unit as the valve is operated. In the single acting cylinders this is the result of communication through the valve between the source of pressure and the pressure side of the cylinder before sufficient pressure in the valve has been reached to equal or exceed the counter force applied by the load on the unit. Various types of check or poppet valves have been employed in directional control valves between the control element and the cylinder, to prevent back flow in the system while this inadequate pressure condition exists and until the pressure of the fluid from the supply pump or other source has increased sufficiently to meet the demands of the load on the hydraulic unit. These check valves, however, have the disadvantage of often opening suddenly when the required pressure has been reached, causing jerky operation and ineffective control of the hydraulic cylinder unit. This condition likewise prevails in double acting hydraulic cylinder units; however, these latter units have the further disadvantage when controlled by the conventional directional valve, of cavitating on the high pressure side of the piston as a result of a rapid and excessive withdrawal of hydraulic fluid from the low pressure side of the piston. Check and poppet valves have also been employed in the conventional valves to control the return of fluid from the low pressure side; however, controlling the operations of the latter valves to obtain proper timing and smooth operation of the hydraulic cylinder has been difficult and frequently ineffective. It is therefore one of the principal objects of the present invention to provide a directional control valve of the spool type for either single or double acting hydraulic cylinders, in which leakage of fluid from the hydraulic cylinder, and consequently load drift, are positively prevented by a poppet or check valve in each line to the cylinder posterior to the spool, and in which no load drop occurs in the hydraulic cylinder when the valve is actuated to operate the cylinder.

Another object of the invention is to provide a directional spool valve for double acting cylinders having a poppet and check valve operating mechanism associated with the hydraulic fluid lines to each end of the cylinder, which has effective feathering action as the latter valves are opened and closed, and which prevents cavitation and avoids load drop at the beginning of and during the operation of the hydraulic cylinder.

Still another object of the invention is to provide a poppet valve mechanism of the aforesaid type, having a pilot control means responsive to the pressure of the fluid in the delivery line for operating the valves in both the fluid delivery and return lines substantially simultaneously.

A further object is to provide a directional control spool valve having a pilot operated poppet valve which positively prevents leakage from the hydraulic cylinder unit while the unit is in the hold position, and in which continued use creates "wear in" and results in more effective operation, thus permitting wider manufacturing tolerances, both in the poppet and spool valve elements, reducing service requirements, and increasing substantially the life of the valve over conventional spool valves.

Another object of the invention is to provide relatively easily fabricated directional control valves for either single or double acting hydraulic cylinders and in either series or parallel circuits, which provide automatic feathering action for the full range of pressures, and which permit accurate, effective and reliable control of the cylinders, regardless of normal variations in available operating fluid pressures.

Another object of the present invention is to provide a comparatively simple and relatively inexpensive spool valve, wherein it is possible to shift the plunger from neutral to drive positions without any intermediate period in which the pump supply line is blocked or in which the connected cylinder is momentarily free to discharge in response to load pressures on the piston cylinder.

In load handling and lifting mechanisms it is important for a satisfactory performance to minimize or eliminate load drop when the handling or lifting mechanism is shifting from one operation or position to another. It is one of the primary objects of the invention to provide a novel take-away lift feature for eliminating load drop, which is incorporated in a poppet or check valve and which can be effectively used in conjunction with a number of different types of basic control valves.

Additional objects and advantages of the present directional control valve will become apparent from the following description and accompanying drawings, wherein.

Figure 1:
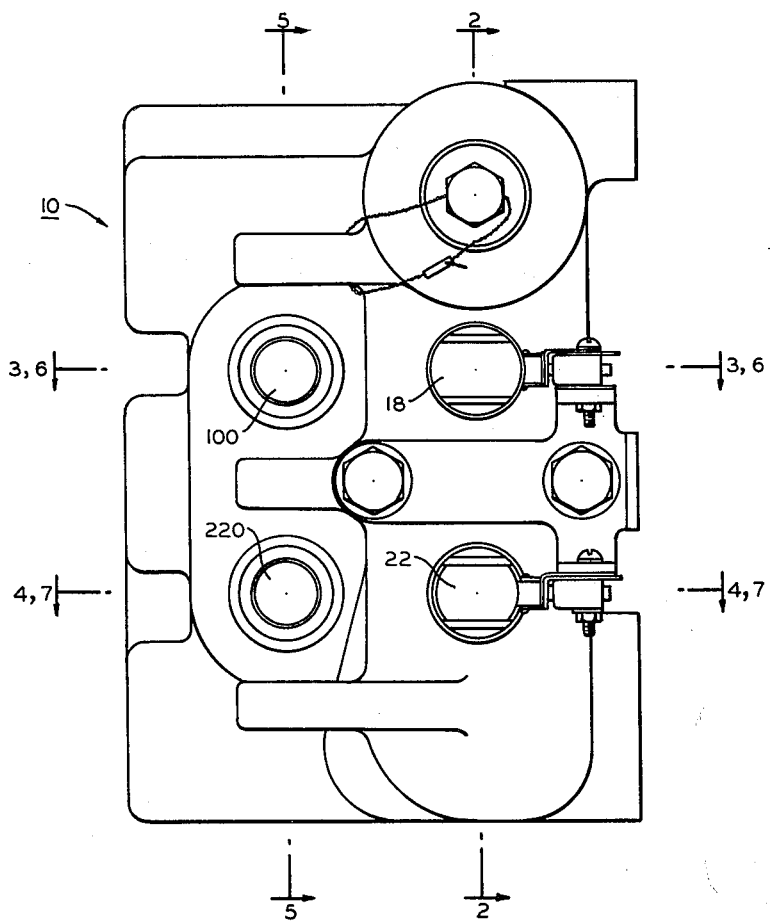
FIGURE 1 is an end elevational view of my directional control valve having two spool valve elements therein, in parallel arrangement in a single valve body.
Figure 2:
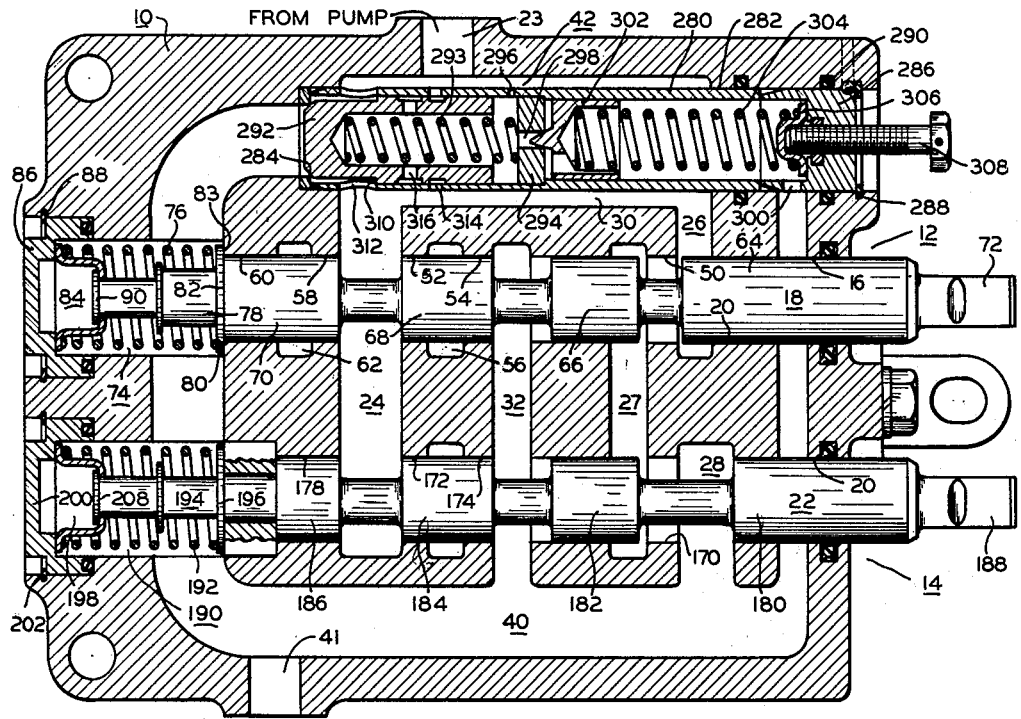
FIGURE 2 is a vertical cross sectional view of the valve shown in FIGURE 1, taken on line 2—2 of the latter figure.
Figure 3:
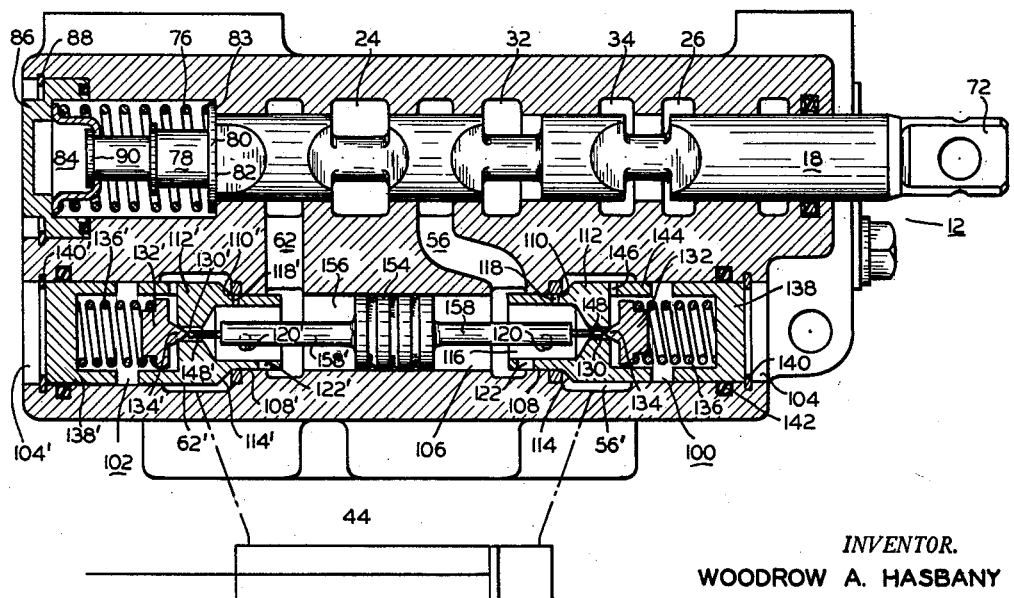
FIGURE 3 is a horizontal cross sectional view of the valve shown in FIGURE 1, taken on line 3—3 of said figure.
Figure 5:
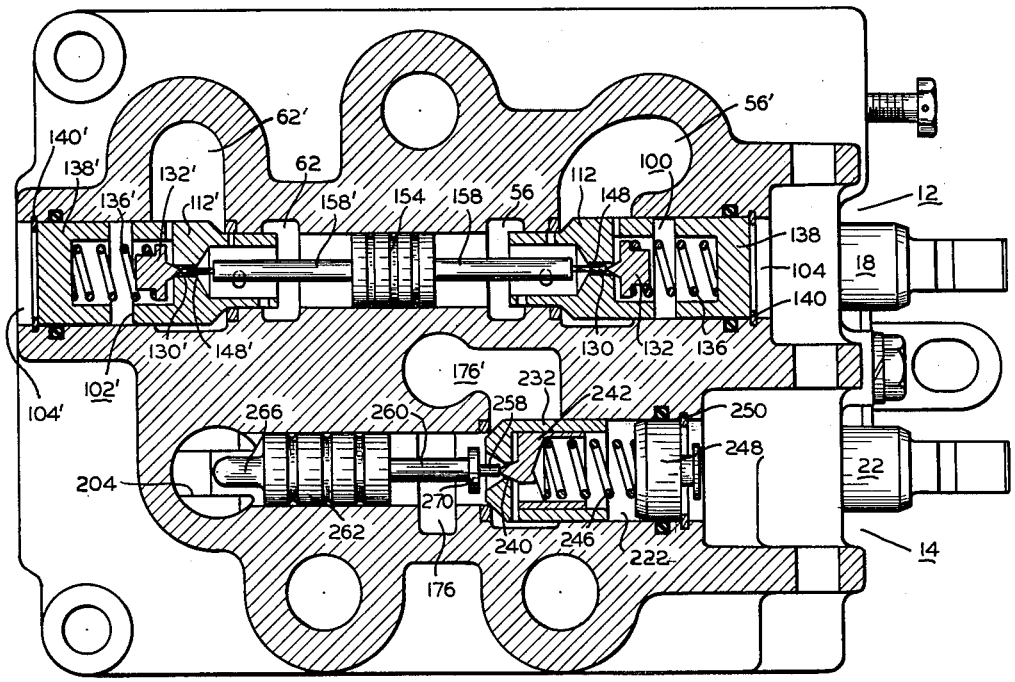
FIGURE 5 is a vertical cross sectional view of the valve shown in FIGURE 1, taken on line 5—5 of the latter figure.

Referring more specifically to the drawings, numeral 10 designates the body of a valve of the open center type, containing complete double and single acting control valve means 12 and 14 connected in parallel in the body, the double acting means 12 having a longitudinal bore 16 extending through body 10 and containing a spool 18 movable axially therein, and the single acting valve means 14 having longitudinal bore 20 extending through the body and containing a spool 22 movable axially therein. These two control valve means are supplied with hydraulic fluid from a pump or other suitable source (not shown) through port 23 and passage 24, and are provided with open center fluid return passages 26, 27 and 28 connected to passage 24 by a longitudinal passage 30. These latter passages are open and connected with passage 24 containing pump supply fluid, and with passage 40 and port 41 for returning the fluid to the tank, when the spools are in their neutral hold position, as shown in FIGURE 3. Passage 24 is also connected to passage 40 for returning fluid to the tank through a pressure relief valve 42, the construction and operation of which will be described in greater detail hereinafter. The valve illustrated in the drawing is suitable for a variety of different types of hydraulic systems, the one shown being designed primarily for controlling a double and a single acting hydraulic cylinder of well known construction, diagrammatically shown at numerals 44 and 48, respectively, and forming a part of a system having a tank and a positive displacement pump for supplying hydraulic fluid from the tank to the valve and thence through the lines to both ends of the double acting hydraulic cylinder and to one end of the single acting hydraulic cylinder. The pump is continuously operating and the fluid from the pump is returned directly to the tank while the valve spools are in their neutral position as shown in FIGURE 2. The hydraulic system and the components thereof, aside from the valve, form no part of the present invention and will not be described herein.

In the double acting means 12, the bore has a series of lands separating the aforementioned passages for pump and tank fluid, including land 50 between pump pressure passage 26 and open center fluid return passage 27, lands 52 and 54 between passage 56 leading to one end of the hydraulic cylinder and pump pressure passage 24 on one side, and between passage 56 and tank return passage 32 on the other side, and lands 58 and 60 between passage 62 leading to the other end of the double acting hydraulic cylinder and pump pressure passage 24 on one side, and between passage 62 and tank return passage 40 on the other side. On spool 18 are lands 64 and 66 for controlling the flow of fluid between passages 26 and 27, land 68 for controlling the flow of fluid from pump passage 24 to passage 56 and from passage 56 to return passage 32, and land 70 for controlling the flow of fluid from pump passage 24 to passage 62 and from passage 62 to return passage 40. The spool is manually operated by a lever (not shown) connected to spool extension 72 and is returned to neutral hold position from either fluid delivery position by a centralizing means 74 consisting of a coil spring 76 disposed around an extension 78 of the spool, and reacting at one end against a washer 80 seated against a shoulder 82 on the spool and shoulder 83 in the valve body, and at the other end against a spring retainer 84 mounted on the end of extension 78 and seating against cap 86 rigidly held in place in the valve body by a retaining ring 88. As spool 18 is shifted for example to the left as viewed in FIGURE 2, washer 80 which is seated against shoulder 82 is moved with the spool, and since retainer 84 is held by cap 86, spring 76 is compressed, and on release of the spool by the operator, will return the spool to its neutral hold position. When the spool is shifted to the right, spring retainer 84 is picked up by enlarged end 90 on extension 78 and is moved with the spool, and since washer 80 is seated against shoulder 83, spring 76 is thereby compressed. On release of the spool by the operator, the spring returns the spool to its neutral hold position.

Passages 56 and 62 for delivering fluid to the two ends of hydraulic cylinder 44 contain poppet valves 100 and 102, respectively, of identical construction and operation, these two valves functioning to prevent leakage of fluid from the ends of the hydraulic cylinder, and consequently to prevent load drift while the valve is in the neutral position, and to avoid load drop by the hydraulic cylinder and cavitation in the cylinder while the cylinder is being operated. Since the two poppet valves are the same, only one will be described in detail, with the same numerals with primes being used to identify the parts of the other. The two valves are seated in cylindrical chambers 104 and 104' at opposite ends of a longitudinal bore 106 intersecting passages 56 and 62 and having lands 108 and 108' separating passage 56 from chamber 104 and passage 62 from chamber 104'. Chambers 104 and 104' are connected to opposite ends of the hydraulic cylinder by sections 56' and 62' of passages 56 and 62, and contain annular valve seats 110 and 110' at the point of juncture between the respective chambers, and lands 108 and 108' of bore 106. Poppet valve 100 consists of a hollow cylindrical element 112 having an annular frusto-conically shaped surface 114 for engaging valve seat 110 and a hollow cylindrical stem 116 of reduced diameter joined integrally with the body portion of the element and movable in bore 108. In order to provide the desired feathering action in the flow of fluid through the bore at land 108, stem 116 contains a graduated series of holes 118, 120 and 122 spaced both longitudinally along and around the stem, hole 118 being the smallest and the first to be uncovered, and hole 122 being the largest and the last to be uncovered as the valve is opened, i.e., as stem 116 is withdrawn to the right as shown in FIGURE 6.

In order to effectively and accurately control the hydraulic cylinders regardless of any normal load thereon or of any normal variation of pressure from the fluid supply pump, a pilot valve means is included in valves 100 and 102, consisting of a port 130 extending longitudinally through the center of element 112 and connecting the hollow interiors of the element and stem 116. The flow of fluid through port 130 is controlled by a valve element 132 having a protrusion 134 in port 130 and urged to its closed position by a coil spring 136 reacting between element 132 and a cup-shaped cap 138, the cap being rigidly held in the end of chamber 104 by a retainer ring 140, and sealed in fluid tight relationship with the wall of the chamber by a gasket 142. The skirt 144 of element 112 slides snugly within chamber 104 and contains a restricted orifice 146 which connects the hollow interior of element 112 with passage 56' leading to one end of cylinder 44; consequently, the hollow interior of the element normally contains fluid under pressure equal to that in the respective end of the cylinder. The pressure of this fluid in chamber 104, together with spring 136, seats valve element 112 firmly onto its seat 110 and prevents leakage from the hydraulic cylinder as long as spool 18 is in its neutral hold position. Pilot valve element 132 is opened against the combined pressures of the fluid in chamber 104 and spring 136 by a pressure operated mechanism, consisting of a small stem 148 extending into port 130 and engaging protrusion 134, and being operated to unseat the protrusion from the port by a longitudinally movable piston 154 in intermediate section 156 of bore 106 acting through shaft 158, the shaft being joined rigidly at one end to the piston and rigidly supporting stem 148 at the other end.

Figure 6:
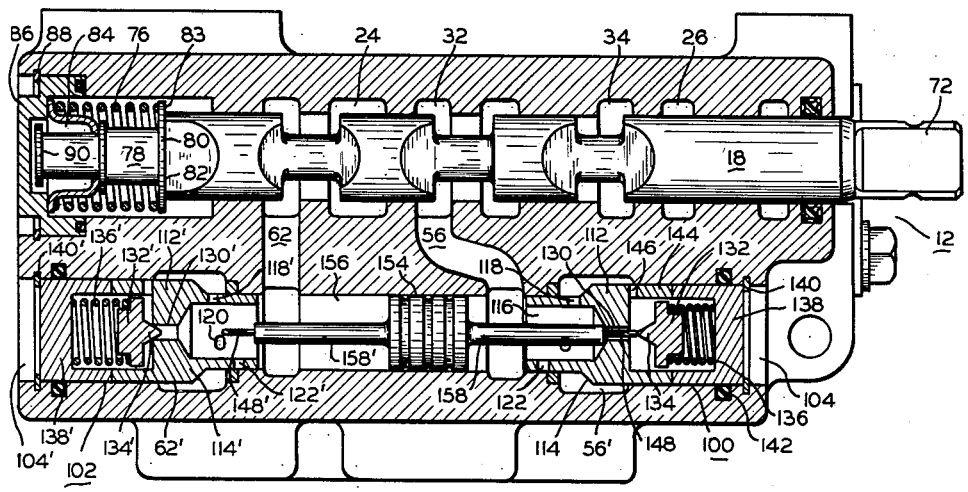
FIGURE 6 is a cross sectional view taken on line 6—6 of FIGURE 1, and is similar to that of FIGURE 3 except that it shows the valve mechanism in a different operating position.

In the foregoing valve construction, when spool 18 is shifted to the left as seen in FIGURE 6, fluid under relatively high pressure from the pump passes from passage 24 into passage 62 and exerts a force against the right hand side of valve element 112', sufficient first to open pilot valve element 132' and then move the element to the left and expose one or more holes 118', 120' and 122', and thereby admit fluid into passage 62' and the left hand end of hydraulic cylinder 44. Simultaneously, the fluid in passage 62 exerts a force against the left hand end of piston 154 sufficient to move the piston to the right, and through shaft 158 and stem 148, unseat pilot valve element 132 from port 130. When port 130 is opened in the foregoing manner, fluid within the hollow interior of valve element 112, i.e. in chamber 104, flows from the chamber through the port into passage 56 which is now connected to passage 32 and thence to the tank. The flow of fluid from chamber 104 reduces the pressure therein sufficiently to permit the higher pressure in passage 56' acting on conical surface 114 to move valve element 112 and stem 116 to the right and uncover one or more holes 118, 120 and 122, permitting fluid to flow from the respective end of hydraulic cylinder 44 through passages 56', 56 and 32 to the tank. As soon as the load on the hydraulic cylinder has moved to the desired position, the operator releases the spool, and centralizing spring 76 returns the spool to its neutral hold position shown in FIGURE 3, thus permitting poppet valve element 112′ to close fully and piston 154 to return to its centered position in bore section 156 under the influence of the pressure applied by pilot valve element 132 on the end of stem 148. Upon the closing of the pilot valve, fluid passing from passage 56′ through orifice 146 into chamber 104 provides sufficient pressure on valve element 112 to close the poppet valve fully, as shown in FIGURE 3.

When it is desired to move the load on the hydraulic cylinder in the opposite direction, spool 18 is shifted to the right, permitting fluid to flow from the pump through passages 24 and 56 and open poppet valve 100 by direct action thereon, and poppet valve 102 through the action of piston 154, to admit fluid into the right hand end of cylinder 44 and to drain fluid from the left hand end. Since the action of the two poppet valves and piston 154 is the same in this operation as that of their counterparts in the operation previously described with respect to the movement of the spool to the left, further detailed description of the operation in response to movement of the spool to the right is not necessary for complete understanding of the operation of the present valve. It is seen from the foregoing description of the operation of the poppet valves 100 and 102 that sudden opening, which possibly would produce detrimental shock on the hydraulic system, is prevented by the feathering action produced by the graduated series of holes in stem 116 as either of the poppet valves is opened by pump pressure, and load drop and cavitation are prevented by the controlled opening of the other poppet valve through the operation of the pilot valve by piston 154.

In the single acting means 14, the bore has a series of lands separating the passages from the pumps, those to the hydraulic cylinder and those returning the fluid to the tank, including land 170 between open center passages 27 and 28, lands 172 and 174 between passage 176 leading to the pressure side of the single acting hydraulic cylinder and pump pressure passage 24 on one side and between passage 176 and tank return passage 32 on the other side, and land 178 between pump pressure passage 24 and return passage 40. On spool 22 are lands 180 and 182 for controlling the flow of fluid between passages 27 and 28, land 184 controlling the flow of fluid from pump passage 24 to passage 176 and from passage 176 to return passage 32, and land 186 for preventing the flow of fluid from pump passage 24 to return passage 40. The spool is manually operated by a lever (not shown) connected to spool extension 188 and is returned to neutral hold position from its delivery position by centralizing means 190, consisting of a coil spring disposed around an extension 194 of the spool and reacting at one end against a washer 196 and at the other end against a spring retainer 198 mounted on the end of extension 194 and seating against a cap 200 rigidly held in place in the valve body by a retaining ring 202. Washer 196 seats against one end of a lever 204, which in turn engages a pin 206 and forms a one way connection with plunger 22, and which is prevented from movement in the clockwise direction from the position shown in FIGURE 4 by a shoulder 207 on the valve body. As spool 22 is shifted, for example to the left as viewed in FIGURE 4, pin 206, the adjacent end of lever 204, and washer 196 are moved with the spool, and since retainer 198 is held in fixed position by cap 200, spring 192 is compressed, and on release of the spool by the operator will return the spool to its neutral position shown in FIGURE 4. When the spool is shifted to the right, spring retainer 198 is picked up by enlarged end 208 on extension 194 and is moved with the spool. Since washer 196 is seated against one end of lever 204, which is incapable of rotating clockwise from the position shown in FIGURE 4, spring 192 is compressed, and on release of the spool by the operator it expands, returning the spool to its neutral position.

Passage 176 for delivering fluid to the single acting hydraulic cylinder 48 contains a poppet valve 220 which is similar in construction and operation to poppet valves 100 and 102 and functions to prevent leakage of fluid from the pressure end of the hydraulic cylinder, and thus to prevent load drift while the valve is in neutral position, and to avoid load drop by the hydraulic cylinder at the beginning of the load shifting operation. The valve 220 is seated in a cylindrical chamber 222 at one end of a longitudinal bore 226 intersecting passage 176 and having a land 228 separating passage 176 from chamber 222. Chamber 222 is connected to the pressure end of the hydraulic cylinder by section 176′ of passage 176, and contains an annular valve seat 230 at the point of juncture between the chamber and land 228 of bore 226. Poppet valve 220 consists of a hollow cylindrical element 232 having an annular frusto-conically shaped surface 234 for engaging valve seat 230.

Effective and accurate control of the hydraulic cylinder, regardless of normal load variation and normal variations in pressure of the fluid supplied by the pump, is obtained by a pilot valve means, consisting of a port 240 extending longitudinally through the center of element 232 and connecting the hollow interior of the element with the portion of bore 126 defined by land 228. The flow of fluid through port 240 is controlled by valve element 242, having a protrusion 244 in port 240, and urged to its closed position by a coil spring 246 reacting between element 242 and a cup shaped cap 248, the cap being rigidly held in the end of chamber 222 by a retainer ring 250, and sealed in fluid tight relationship with the wall of the chamber by gasket 252. The skirt 254 of element 232 slides snugly within chamber 222 and contains a restricted orifice 256 which connects the hollow interior of element 232 with passage 176′ leading to the hydraulic cylinder. With this structure the hollow interior of the element normally contains fluid under pressure equal to that in the pressure end of the hydraulic cylinder 48, and this pressure, together with the force of spring 246, seats valve element 232 firmly onto its seat 230 and prevents leakage from the hydraulic cylinder as long as the spool 22 is in its neutral hold position. Pilot valve element 242 is opened against the combined pressures of the fluid in chamber 222 and spring 246 by a mechanically operated mechanism, consisting of a small stem 258 extending into port 240 and engaging protrusion 244 and being operated to unseat the protrusion from the port by a longitudinally movable shaft 260 and piston 262. The stem, shaft and piston are moved longitudinally in bore 226 by lever 204 having a bifurcated end extending on either side of extension 194 and engaging pin 206, and having a portion 264 for engaging a lug 266 projecting axially from the end of piston 262. It is thus seen that as spool 22 is shifted to the left as shown in the drawings, lever 204 is rotated counter-clockwise, applying pressure to lug 266 and moving piston 262, shaft 260 and stem 258 in the direction to unseat valve 242. The feathering action in this modified form of poppet valve is obtained by annular member 270 mounted on the end of shaft 260 within the portion of bore 226 defined by land 228. As the poppet valve is initially opened by the action of stem 258, member 270 restricts the flow through the adjacent portion of bore 226 until the member has passed to the right sufficiently to clear the restricted portion of the bore, as defined by land 228.

Figure 4:
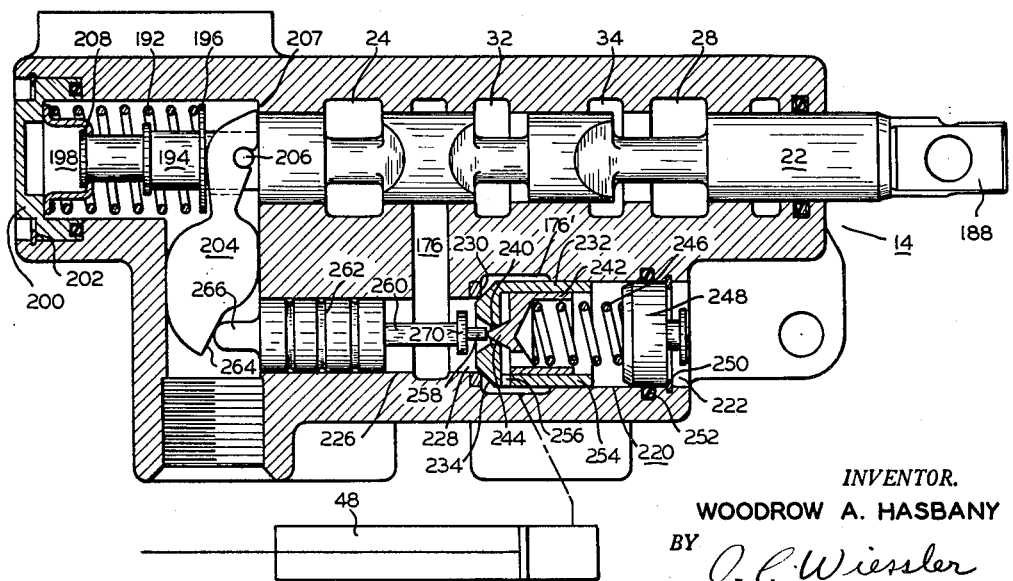
FIGURE 4 is a horizontal cross sectional view of the valve shown in FIGURE 1, taken on line 4—4 of said figure.
Figure 7:
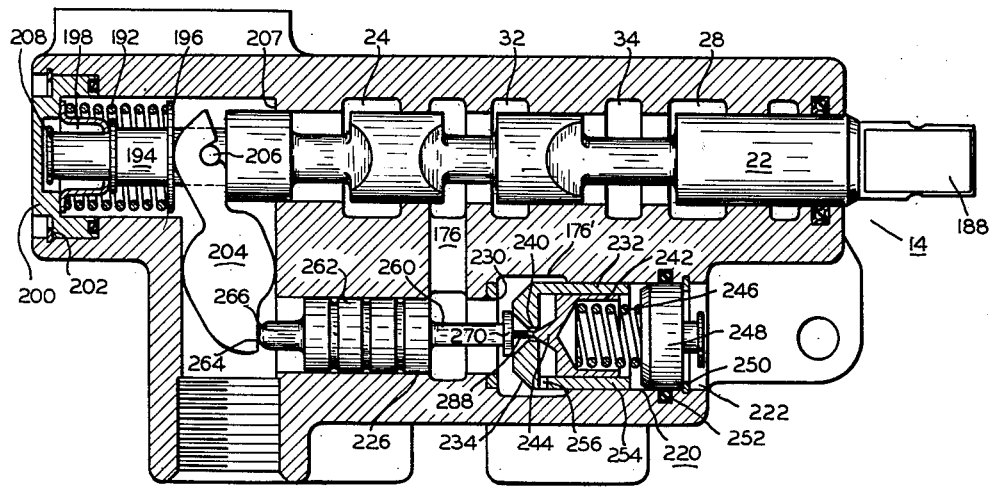
FIGURE 7 is a cross sectional view taken on line 7—7 of FIGURE 1, and is similar to that of FIGURE 4 except that it shows the valve mechanism in a different operating position.

In the single acting means just described, when spool 22 is shifted to the right as viewed in FIGURE 4, fluid under pressure from the pump passes through passages 24 and 176 to cylindrical bore 226 where it exerts a force against the left hand side of valve element 232 sufficient first to open the pilot valve and then move the element to the right and admit fluid through passage 176′ to the pressure end of hydraulic cylinder 48. Valve element 232 remains open as long as fluid is flowing to cylinder 48, but closes immediately upon return of spool 22 to its neutral position, to prevent back flow or leakage from the cylinder and passage 176' to passage 176. When the load on the hydraulic cylinder 48 has been moved to the desired position, the operator releases spool 22, and centralizing spring 192 returns the spool to its neutral hold position shown in FIGURE 4, the centralizing spring having been compressed by the movement of spring retainer 198 to the right with spool 22 while washer 196 was being held in fixed position by the bifurcated end of lever 204. When the load on cylinder 48 is to be moved in the opposite direction, the fluid in the pressure end of cylinder 48 is withdrawn. In this operation spool 22 is moved to the left as shown in FIGURE 7, connecting passages 176 and 32 and moving lever 204 in the counter-clockwise direction. This moves piston 262 to the right, causing stem 258 to engage projection 244 of pilot valve element 242 and move the pilot valve from its seat around port 240, thereby permitting fluid to flow from chamber 222 into the low pressure passage 176 and thence to the tank through passage 32. The flow of fluid from chamber 222 reduces the pressure therein sufficiently to permit the higher pressure in passage 176' acting on conical surface 234 to move valve element 232 to the right and permit fluid to flow from the pressure end of cylinder 48 through passages 176', 176 and 32 to the tank. As soon as the load on the hydraulic cylinder has been moved to the desired position, the operator releases the spool, and centralizing spring 192, pressing against washer 196 and the bifurcated end of lever 204, returns the spool to its neutral hold position as shown in FIGURE 4, thus permitting lever 204 to rotate in the clockwise direction and the pilot valve to close, and stem 258, shaft 260 and piston 262 to return to their original positions as shown in FIGURE 4.

The pressure relief valve 42 is one of a number of different structures which can be used in the present control valve, and consists of a cylindrical sleeve 280 seated in a longitudinal bore 282 terminating on the left hand at an annular valve seat 284 communicating with fluid return passage 40. Bore 282 intersects passage 30 and is interposed between port 23 and passage 24. Sleeve 280 is held in place in bore 282 by a cap 286 inserted in the right hand end of the bore and held therein by a retainer ring 288, and sealed in fluid tight relationship with the valve body by a gasket 290. A piston shaped valve element 292 is reciprocably mounted in sleeve 280 and is urged to its closed position on seat 284 by a coil spring 293, reacting at one end against the inner end of the piston and at the other end against a partition 294 rigidly secured in place near the center of the sleeve. The hollow interior of the piston and the adjacent sleeve portion are connected to passage 30 containing pump pressure fluid by a restricted orifice 296, and to tank return passage 40 by an orifice 298 in partition 294 and a port 300 in the side of the sleeve. Orifice 298 is controlled by a pilot valve 302 urged to its closed position in the orifice by a spring 304, reacting at one end against the pilot valve and at the other end against a spring retainer 306, the retainer being adjustable longitudinally in the sleeve by an adjustment screw 308 to vary the pressure at which the relief valve will open. Valve element 292 is urged toward open position by the pressure of the fluid in passages 24 and 30 on annular surface 310.

In the operation of the relief valve, in which the pressure of the fluid from the pump in passages 24 and 30 is less than that required to open the relief valve, the pressure of the fluid admitted into the sleeve and urging valve element 292 to its seat is the same as pump pressure. Should the pressure rise to the limit as determined by the setting of screw 308, pilot valve 302 opens and permits fluid to bleed from the sleeve behind element 292 and decrease the pressure therein sufficiently to permit the pump pressure acting on surface 310 to unseat the element. As element 292 initially moves to the right, the pressure of the fluid in passages 24 and 30 is relieved by the fluid passing through an opening 312 into passage 40. Further movement of the element to the right registers ports 314 and 316 in sleeve 280 and element 292, permitting the pressure in the sleeve behind the element again to equal the pump pressure in passages 24 and 30, and consequently the element immediately moves to its closed position. The foregoing operation is repeated whenever the pressure from the pump exceeds the desired maximum limit.

Various combinations of the single and double acting means may be used in combination with parallel or series directional control valves, and the poppet valve disclosed herein may be embodied in other types of control valves. Various other changes and modifications may be made without departing from the scope of the invention.

I claim:

1. A valve for controlling a single acting hydraulic cylinder and a double acting hydraulic cylinder, comprising a body having two parallel bores therein and containing a passage for supply fluid, a passage for fluid return, a passage for connection to one end of the single acting cylinder and a passage for connection to each end of the double acting cylinder, a spool in each of said bores for controlling the flow of fluid through said passages to and from the cylinders, a spring means for centralizing said spools in neutral hold position, each of said last mentioned passages having a cylindrical chamber with a port and valve seat at one end, and a poppet valve in each of said chambers, including a cylindrical valve element having a frusto-conical portion adjacent the valve seat subjected to the pressure of fluid in the passage between the chamber and cylinder tending to unseat said element, a hollow center open-end stem on said element extending into said port and having a plurality of graduated holes therethrough for controlled fluid flow, said element having a hollow interior and an orifice connecting said interior with the hollow center of said stem and a restricted orifice connecting said interior with the passage to the cylinder, a valve means in said element for controlling the flow of fluid through said first mentioned orifice, a spring urging said valve means to its closed position, a stem for opening said valve means, a double acting piston responsive to supply pressure for operating the stem of the poppet valves in each passage for the double acting cylinder, and a mechanical linkage including a bifurcated lever operated by the movement of the spool controlling the flow of fluid to the single acting cylinder for operating the stem of the poppet valve in said passage.

2. A valve for controlling a single acting hydraulic cylinder and a double acting hydraulic cylinder, comprising a body having two bores therein and containing a passage for supply fluid, a passage for fluid return, a passage for connection to one end of the single acting cylinder and a passage for connection to each end of the double acting cylinder, a spool in each of said bores for controlling the flow of fluid through said passages to and from the cylinders, each of said last mentioned passages having a cylindrical chamber with a port and valve seat at one end, and a poppet valve in each of said chambers, including a cylindrical valve element having a portion adjacent the valve seat subjected to the pressure of fluid in the passage between the chamber and cylinder tending to unseat said element, a means on said element for feathering the flow of fluid through the port, said element having a hollow interior and an orifice connecting said interior with said port and a restricted orifice connecting said interior with the passage to the cylinder, a valve means in said element for controlling the flow of fluid through said first mentioned orifice, a resilient means urging said valve means to its closed position, a stem for opening said valve means, a double acting movable wall responsive to supply pressure for operating the stems of the poppet valve in each passage for the double acting cylinder, and a mechanical linkage including a bifurcated lever operated by the movement of the spool controlling the flow of fluid to the single acting cylinder for operating the stem of the poppet valve in said passage.

3. A valve for controlling single and double acting hydraulic cylinders, comprising a body having two bores therein and containing a passage for supply fluid, a passage for fluid return, a passage for connection to one end of the single acting cylinder and a passage for connection to each end of the double acting cylinder, means for controlling the flow of fluid through said passages to and from the cylinders, each of said last mentioned passages having a cylindrical chamber with a port and valve seat at one end, and a poppet valve in each of said chambers, including a cylindrical valve element having a portion adjacent the valve seat subjected to the pressure of fluid in the passage between the chamber and cylinder tending to unseat said element, a means for feathering the flow of fluid through said ports, said element having a hollow interior and an orifice connecting said interior with said port and a restricted orifice connecting said interior with the passage to the cylinder, a valve means in said element for controlling the flow of fluid through said first mentioned orifice, a resilient means urging said valve means to its closed position, a stem for opening said valve means, a double acting means responsive to supply pressure for operating the stem of each poppet valve in each passage for the double acting cylinder, and a mechanical linkage operated by the movement of said first mentioned means for operating the stem of the poppet valve in the passage for the single acting cylinder.

4. A valve for controlling a double acting hydraulic cylinder, comprising a body having a longitudinal bore therein and containing a passage for supply fluid, a passage for fluid return and a passage for connection to each end of the double acting cylinder, a spool in said bore for controlling the flow of fluid through said passages to and from the cylinder, a spring means for centralizing said spool in neutral hold position, each of said last mentioned passages having a cylindrical chamber with a port and valve seat at one end, and a poppet valve in each of said chambers, including a cylindrical valve element having a frusto-conical portion adjacent the valve seat subjected to the pressure of fluid in the passage between the chamber and cylinder tending to unseat said element, a hollow center open-end stem on said element extending into said port and having a plurality of graduated holes therethrough for controlled fluid flow, said element having a hollow interior and an orifice connecting said interior with the hollow center of said stem, and a restricted orifice connecting said interior with the passage to the cylinder, a valve means in said element for controlling the flow of fluid through said first mentioned orifice, a spring urging said valve means to its closed position, a stem for opening said valve means, and a double acting piston responsive to supply pressure for operating the stem of the poppet valve in each passage for the double acting cylinder.

5. A valve for controlling a double acting hydraulic cylinder, comprising a body having a longitudinal bore therein and containing a passage for supply fluid, a passage for fluid return and a passage for connection to each end of the double acting cylinder, a spool in said bore for controlling the flow of fluid through said passages to and from the cylinder, each of said last mentioned passages having a cylindrical chamber with a port and valve seat at one end, and a poppet valve in each of said chambers regulating the flow of fluid both to and from the cylinder, including a cylindrical valve element having a portion adjacent the valve seat subjected to the pressure of fluid in the passage between the chamber and cylinder for unseating said element when the respective passage is connected to the fluid return passage and having another portion responsive solely to supply fluid pressure for operating said valve element, said element having a hollow interior and an orifice connecting said interior with said port and a restricted orifice connecting said interior with the passage to the cylinder, a valve means in said element for controlling the flow of fluid through said first mentioned orifice, a resilient means urging said valve means to its closed position, a stem for opening said valve means, and a double acting movable wall responsive to supply pressure for operating the stem of the poppet valve in each passage for the double acting cylinder.

6. A valve for controlling a double acting hydraulic cylinder, comprising a body having a longitudinal bore therein and containing a passage for supply fluid, a passage for fluid return and a passage for connection to each end of a double acting cylinder, means for controlling the flow of fluid through said passages to and from the cylinder, each of said last mentioned passages having a cylindrical chamber with a port and valve seat at one end, and a poppet valve in each of said chambers, including a cylindrical valve element having a portion adjacent the valve seat subjected to the pressure of fluid in the passage between the chamber and cylinder tending to unseat said element, a hollow center open-end stem on said element extending into said port and having a plurality of graduated holes therethrough for controlled fluid flow, said element having a hollow interior and an orifice connecting said interior with the hollow center of said stem, and a restricted orifice connecting said interior with the passage to the cylinder, a valve means in said element for controlling the flow of fluid through said first mentioned orifice, a spring urging said valve means to its closed position, a stem for opening said valve means, and a double acting piston responsive to supply pressure for operating the stem of the poppet valve in each passage for the double acting cylinder.

7. A valve for controlling a double acting hydraulic cylinder, comprising a body having a longitudinal bore therein and containing a passage for supply fluid, a passage for fluid return and a passage for connection to each end of a double acting cylinder, means for controlling the flow of fluid through said passages to and from the cylinder, each of said last mentioned passages having a cylindrical chamber with a port and valve seat at one end, and a poppet valve in each of said chambers, including a cylndrical valve element having a portion adjacent the valve seat subjected to the pressure of fluid in the passage between the chamber and cylinder tending to unseat said element, a means on said element for feathering the flow of fluid through the port, said element having a hollow interior and an orifice connecting said interior with the port and a restricted orifice connecting said interior with the passage to the cylinder, a valve means in said element for controlling the flow of fluid through said first mentioned orifice, a resilient means urging said valve means to its closed position, a member for opening said valve means, and a double acting means responsive to supply pressure for operating said member to open said valve means of each poppet valve.

8. A valve for controlling a double acting hydraulic cylinder, comprising a body containing passages for connection to the ends of a double acting cylinder, each of said passages having a cylindrical chamber with a port and valve seat at one end, a cylindrical element in said chamber engaging said seat, and a hollow center open-end stem on said element extending into said port and having a plurality of graduated holes therethrough for controlled fluid flow.

9. A valve for controlling a double acting hydraulic cylinder, comprising a body having a longitudinal bore therein and containing a passage for supply fluid, a passage for fluid return and a passage for connection to each end of a double acting cylinder, each of said last mentioned passages having a cylindrical chamber with a port and valve seat at one end, and a poppet valve in each of said chambers regulating the flow of fluid both to and from the cylinder, including a cylindrical valve element having a portion subjected to the pressure of fluid in the passage between the chamber and cylinder for unseating said element when the respective passage is connected to the fluid return passage and having another portion responsive solely to supply fluid pressure for operating said valve element, said element having a hollow interior and an orifice connecting said interior with said port and a restricted orifice connecting said interior with the passage to the cylinder, a valve means in said element for controlling the flow of fluid through said first mentioned orifice, a resilient means urging said valve means to its closed position, and a means responsive to supply fluid pressure for opening said valve means.

10. In a valve, a body having a passage for connection to each end of a double acting cylinder for supply fluid and return fluid, each of said passages having a cylindrical chamber with a port and valve seat at one end, and a poppet valve in each of said chambers regulating the flow of fluid both to and from the cylinder, including a cylindrical valve element having a portion subjected to the pressure of fluid in the passage between the chamber and cylinder tending to unseat said element and having another portion responsive solely to supply fluid pressure for operating said valve element, said element having a hollow interior and an orifice connecting said interior with said port and a restricted orifice connecting said interior with the passage to the cylinder, a valve means in said element for controlling the flow of fluid through said first mentioned orifice, a resilient means urging said valve means to its closed position, and a means for opening said valve means.

11. In a valve, a body having a passage for connection to each end of a double acting cylinder, each of said passages having a cylindrical chamber with a port and valve seat at one end, and a poppet valve in each of said chambers, including a cylindrical valve element having a frusto-conical portion adjacent the valve seat subjected to the pressure of fluid in the passage between the chamber and cylinder tending to unseat said element, a hollow center open-end stem on said element extending into said port and having a plurality of graduated holes therethrough for controlled fluid flow, said element having a hollow interior and an orifice connecting said interior with the hollow center of said stem and a restricted orifice connecting said interior with the passage to the cylinder, a valve means in said element for controlling the flow of fluid through said first mentioned orifice, a spring urging said valve means to its closed position, and a means responsive to supply fluid pressure for opening said valve means.

12. A valve for controlling a single acting hydraulic cylinder, comprising a body having a bore therein and containing a passage for supply fluid, a passage for fluid return and a passage for connection to one end of the single acting cylinder, a spool in said bore for controlling the flow of fluid to and from the cylinder, the last mentioned passage having a cylindrical chamber with a port and valve seat at one end, and a poppet valve in said chamber including a cylindrical valve element having a frusto-conical portion adjacent the valve seat subjected to the pressure of fluid in the passage between the chamber and cylinder tending to unseat said element, a hollow center open-end stem on said element extending into said port and having a plurality of graduated holes therethrough for controlled fluid flow, said element having a hollow interior and an orifice connecting said interior with the hollow center of said stem and a restricted orifice connecting said interior with the passage to the cylinder, a valve means in said element for controlling the flow of fluid through said first mentioned orifice, a spring urging said valve means to its closed position, a stem for opening said valve means and a mechanical linkage including a bifurcated lever operated by the movement of said spool for operating the stem of the poppet valve in said passage.

13. A valve for controlling a single acting hydraulic cylinder, comprising a body having a bore therein and containing a passage for supply fluid, a passage for fluid return and a passage for connection to one end of the single acting cylinder, means for controlling the flow of fluid through said passages to and from the cylinder, the last mentioned passage having a cylindrical chamber with a port and a valve seat at one end communicating with the respective passage, and a poppet valve in said chamber, including a cylindrical valve element having a portion subjected to the pressure of fluid in the passage between the chamber and cylinder tending to unseat said element, a means for feathering the flow of fluid through the port, said element having a hollow interior and an orifice connecting said interior with said port and a restricted orifice connecting said interior with the passage to the cylinder, a valve means in said element for controlling the flow of fluid through said first mentioned orifice, a resilient means urging said valve means to its closed position, a member for opening said valve means, and a mechanical linkage operated by the movement of said first mentioned means for operating said member to open said valve means.

14. In a valve for controlling a power unit, a body having a bore therein and containing a passage for connection to said unit for supply fluid and return fluid, a spool in said bore for controlling the flow of fluid through said passage, a poppet valve in said passage including a valve seat in said passage regulating the flow of fluid both to and from the cylinder, a valve element engaging said seat and having a portion responsive to pressure of fluid in the passage between said element and said unit for unseating the element, another portion responsive to the pressure of said fluid for seating said element and a third portion responsive solely to the supply fluid between said spool and said element for unseating said element, a pilot valve means in said valve element for relieving the pressure on said second mentioned portion, and a means including a movable wall responsive to the supply pressure for opening said pilot valve means.

15. In a valve for controlling a power unit, a body having a bore therein and containing a passage for connection to said unit for supply fluid and return fluid, means for controlling the flow of fluid through said passage, a poppet valve in said passage including a valve seat in said passage regulating the flow of fluid both to and from the cylinder, a valve element for engaging said seat and having a portion responsive to pressure of fluid in the passage between said element and said unit for unseating the element, another portion responsive to the pressure of said fluid for seating said element and a third portion responsive solely to the supply fluid between said flow control means and said element for unseating said element, a pilot valve means for relieving the pressure on said second mentioned portion and a means for opening said pilot valve means.

16. In a valve for controlling a power unit, a body having a bore therein and containing a passage for connection to said unit for supply fluid and return fluid, a spool in said bore for controlling the flow of fluid through said passage, a poppet valve in said passage including a valve seat in said passage regulating the flow of fluid both to and from the cylinder, a valve element for engaging said seat having one portion responsive to pressure of fluid in the passage between said element and said unit for unseating the element, another portion responsive to the pressure of said fluid for seating said element and a third portion responsive to the supply fluid for unseating said element, a pilot valve means for relieving the pressure on said second mentioned portion, and a means including a mechanical linkage operated by the movement of said spool for opening said pilot valve means.

17. In a valve for controlling a power unit, a passage for connection to said unit for supply fluid and return fluid, means for controlling the flow of fluid through said passage, a poppet valve in said passage including a valve seat in said passage regulating the flow of fluid both to and from the cylinder, a valve element engaging said seat and having a portion responsive to pressure of fluid in the passage between said element and said unit for unseating the element, another portion responsive to the pressure of said fluid for seating said element and a third portion responsive to the supply fluid for unseating said element, a pilot valve means for relieving the pressure on said second mentioned portion, and a means including a mechanical linkage operated by the movement of said first mentioned means for opening said pilot valve means.

References Cited in the file of this patent

UNITED STATES PATENTS

| | | |
|---|---|---|
| 2,554,930 | Ulinski | May 29, 1951 |
| 2,592,906 | Jirsa et al. | Apr. 15, 1952 |
| 2,612,375 | Worthington | Sept. 30, 1952 |
| 2,622,611 | Stark | Dec. 23, 1952 |
| 2,644,429 | Waterman | July 7, 1953 |
| 2,653,626 | Finlayson | Sept. 29, 1953 |
| 2,691,964 | Stickney | Oct. 19, 1954 |
| 2,821,211 | Wittren | Jan. 28, 1958 |
| 2,925,824 | Rockwell | Feb. 23, 1960 |
| 2,954,051 | Krehbiel | Sept. 27, 1960 |
| 2,964,016 | Talak | Dec. 13, 1960 |
| 2,969,044 | Ledue | Jan. 24, 1961 |
| 2,995,114 | Starr | Aug. 8, 1961 |

FOREIGN PATENTS

| | | |
|---|---|---|
| 832,516 | Great Britain | Apr. 13, 1960 |